United States Patent
Itman et al.

(10) Patent No.: US 11,418,947 B2
(45) Date of Patent: Aug. 16, 2022

(54) MOBILE NETWORK USER MONITORING SYSTEM

(71) Applicant: RADCOM LTD., Tel Aviv (IL)

(72) Inventors: Yehiel Itman, Givatayim (IL); David Dragilev, Petach Tikva (IL); Tomer Tuvia Ilan, Rosh Haayin (IL); Eyal David Harari, Kiryat Ono (IL)

(73) Assignee: RADCOM LTD., Tel Aviv (IL)

( * ) Notice: Subject to any disclaimer, the term of this patent is extended or adjusted under 35 U.S.C. 154(b) by 99 days.

(21) Appl. No.: 16/328,738

(22) PCT Filed: Jan. 16, 2017

(86) PCT No.: PCT/IL2017/050050
§ 371 (c)(1),
(2) Date: Feb. 27, 2019

(87) PCT Pub. No.: WO2018/042412
PCT Pub. Date: Mar. 8, 2018

(65) Prior Publication Data
US 2019/0200216 A1 Jun. 27, 2019

Related U.S. Application Data

(60) Provisional application No. 62/381,024, filed on Aug. 30, 2016.

(51) Int. Cl.
*H04W 8/26* (2009.01)
*H04L 12/14* (2006.01)
*H04W 4/24* (2018.01)
*H04M 15/00* (2006.01)
(Continued)

(52) U.S. Cl.
CPC .............. *H04W 8/26* (2013.01); *G06F 16/00* (2019.01); *H04L 12/14* (2013.01);
(Continued)

(58) Field of Classification Search
None
See application file for complete search history.

(56) References Cited

U.S. PATENT DOCUMENTS

| 2007/0185918 A1 | 8/2007 | Hallengren |
| 2008/0275943 A1 | 11/2008 | Grayson et al. |

(Continued)

FOREIGN PATENT DOCUMENTS

| EP | 1014619 | 6/2000 |
| EP | 2469752 | 6/2012 |
| EP | 2680637 | 1/2014 |

OTHER PUBLICATIONS

International Search Report and Written Opinion dated May 11, 2017 for International Application No. PCT/IL2017/050050 filed Jan. 16, 2017.

(Continued)

*Primary Examiner* — Chi H Pham
*Assistant Examiner* — Raul Rivas
(74) *Attorney, Agent, or Firm* — A.C. Entis-IP Ltd.; Allan C. Entis

(57) ABSTRACT

Apparatus comprising a plurality of servers and at least one router that are configured to receive from a communications network data records that the network generates, which are associated with IMSIs and comprise metadata characterizing communications that the network propagates, associate IMSIs with the data records, and store data records associated with a same IMSI in a memory correlated with their shared associated IMSI.

10 Claims, 3 Drawing Sheets

(51) Int. Cl.
  *G06F 16/00*     (2019.01)
  *H04L 101/654*   (2022.01)
  *H04W 8/18*      (2009.01)
  *H04W 24/08*     (2009.01)

(52) U.S. Cl.
  CPC ........ *H04L 61/6054* (2013.01); *H04M 15/57* (2013.01); *H04M 15/70* (2013.01); *H04M 15/74* (2013.01); *H04M 15/8214* (2013.01); *H04W 4/24* (2013.01); *H04W 8/183* (2013.01); *H04W 24/08* (2013.01)

(56)          References Cited

U.S. PATENT DOCUMENTS

| | | |
|---|---|---|
| 2009/0094318 A1 | 4/2009 | Gladwin et al. |
| 2012/0173711 A1 | 7/2012 | Bollapalli et al. |
| 2014/0143383 A1 | 5/2014 | Skog |
| 2017/0230822 A1* | 8/2017 | Gao ..................... H04W 24/04 |

OTHER PUBLICATIONS

Dias, Daniel M. et al, A Scalable and Highly Available Web Server, In: Compcon '96. Tecknologies for the Information Superhighway Digest of Papers, 1996, IEEE pp. 85-92.

Greenberg, Albert et al, VL2: A Scalable and Flexible Data Center Network, In: ACM SIGCOMM computer communication review. ACM, 2009 pp. 51-62.

International Preliminary Report on Patentability dated Dec. 31, 2018 for Application No. PCT/IL2017/050050 filed Jan. 16, 2017.

\* cited by examiner

MOBILE NETWORK USER MONITORING SYSTEM

RELATED APPLICATIONS

The present application is a U.S. National Phase of PCT/IL2017/050050 filed on Jan. 16, 2017, which claims the benefit under 35 U.S.C. 119(e) of U.S. Provisional Application 62/381,024 filed on Aug. 30, 2016. The contents and disclosure of each of the prior applications are incorporated herein by reference in their entirety.

FIELD

Embodiments of the invention relate to load balancing tasks comprised in monitoring a communications network.

BACKGROUND

Modern communications networks support large, varied, and growing populations of users and an ever increasing gamut of user services and user applications for users who access the networks using any of various stationary and/or mobile user equipment (UE). The networks span not only global populations and geography, but a plethora of methods, devices, infrastructures, and protocols for propagating data, voice, and video content provided by a host of different large and small service providers.

As the various software and hardware resources that support the networks, configure paths along which network packets propagate in the networks, and provide services mediated by the networks have become more sophisticated, the resources have become fungible and logically abstracted away from their particular physical structures. The physical devices and apparatus underlying modern communications networks have become commodity resources that are configurable by software to provide virtualizations of network functions, referred to as "Network Functions Virtualization" (NFV), and "Software Defined Networks" (SDNs). And dedicated physical devices that provide particular network functionalities have been or are being replaced by software entities that access the physical commodities of a network, and/or other software entities of the network, on an "as need" basis to communicate with each other and provide functionalities required by the networks. The zoology of software entities are conventionally referred to as virtual entities, with a particular virtual entity typically distinguished by a name of a functionality it provides.

The extensive, complex infrastructure of a modern communications network typically comprises a mix of dedicated physical devices and an ever increasing, if not dominant number, of virtual network entities. The devices and entities are engaged in an incessant packet exchange chatter approaching hundreds of gigabits per second (Gbps) that supports voice, data, and video communications traffic between communication devices using the network. To monitor the traffic and maintain performance for the multitude of services that a network provides, the network generates a flood of data records comprising metadata, which characterizes various aspects of calls, transactions, and sessions, traversing the network and may be used to calculate Key Performance Indicators (KPI) of the network. A data record comprising metadata associated with a network voice call or a text message may, typically be referred to as a Call Data Record (CDR). A generalized data record, that may comprise metadata for a network call, transaction, or session, and is more suitable for modern communications networks that support a large variety of voice, text, video, and data communications, may be referred to as an extended Data Record (xDR). Hereinafter, xDR and "extended data record" may be used generically to refer to a CDR and/or an xDR. Processing metadata comprised in xDRs to monitor and troubleshoot a communications network to maintain network Quality of Service (QoS) and Quality of Experience (QoE) has become a demanding challenge.

SUMMARY

An aspect of an embodiment of the disclosure relates to providing apparatus configured to determine which xDRs that a communications network generates for telecommunication traffic that the network propagates are associated with a same SIM or USIM (Universal Subscriber Identity Module), generically referred to as a SIM. The apparatus correlates and stores the xDRs associated with a same SIM in a database, hereinafter also referred to as a xDR database, so that data comprised in the xDRs associated with the SIM may be accessed and processed to determine and monitor a feature, hereinafter also referred to as a use feature, characterizing a use of the network by a user identified with the SIM. In an embodiment the apparatus, hereinafter also referred to as a "User-Monitor" or "U-Monitor", comprises a scalable configuration of routers and servers, also referred to respectively as U-Routers and U-Servers. The U-Routers and U-Servers are configured to receive xDRs generated by components in the network and associate the received xDRs with IMSIs (International Mobile Subscriber Identity) that uniquely identify SIMs associated with the xDRs. The U-Monitor may use the IMSIs to correlate the xDRs in the xDR database with their respective SIMs and thereby xDRs identified with a same SIM.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1:
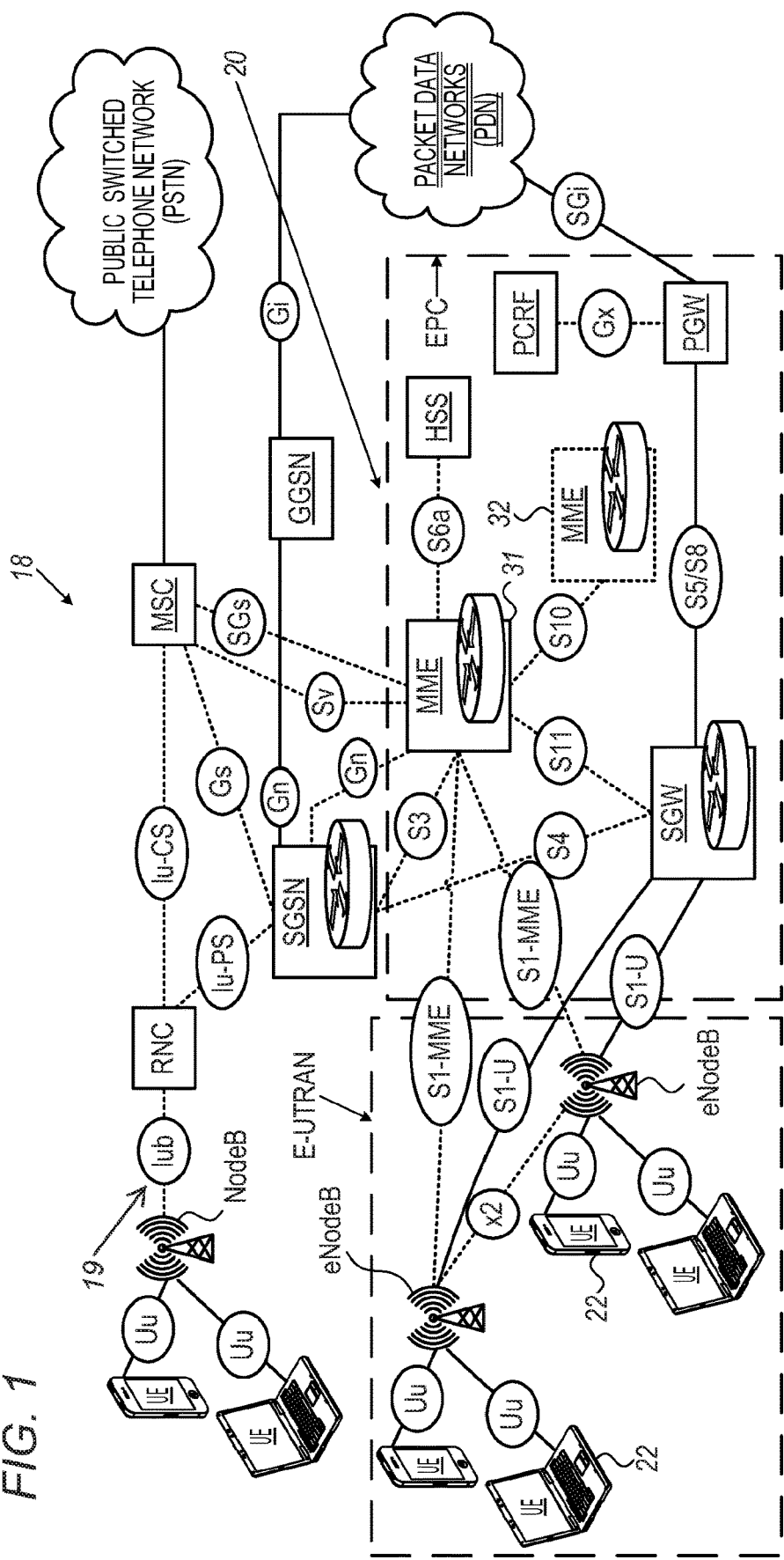
FIG. 1 schematically shows a communications network that supports communications between communication devices and comprises network elements that generate xDRs for communications that are propagated by the network.
Figure 2:
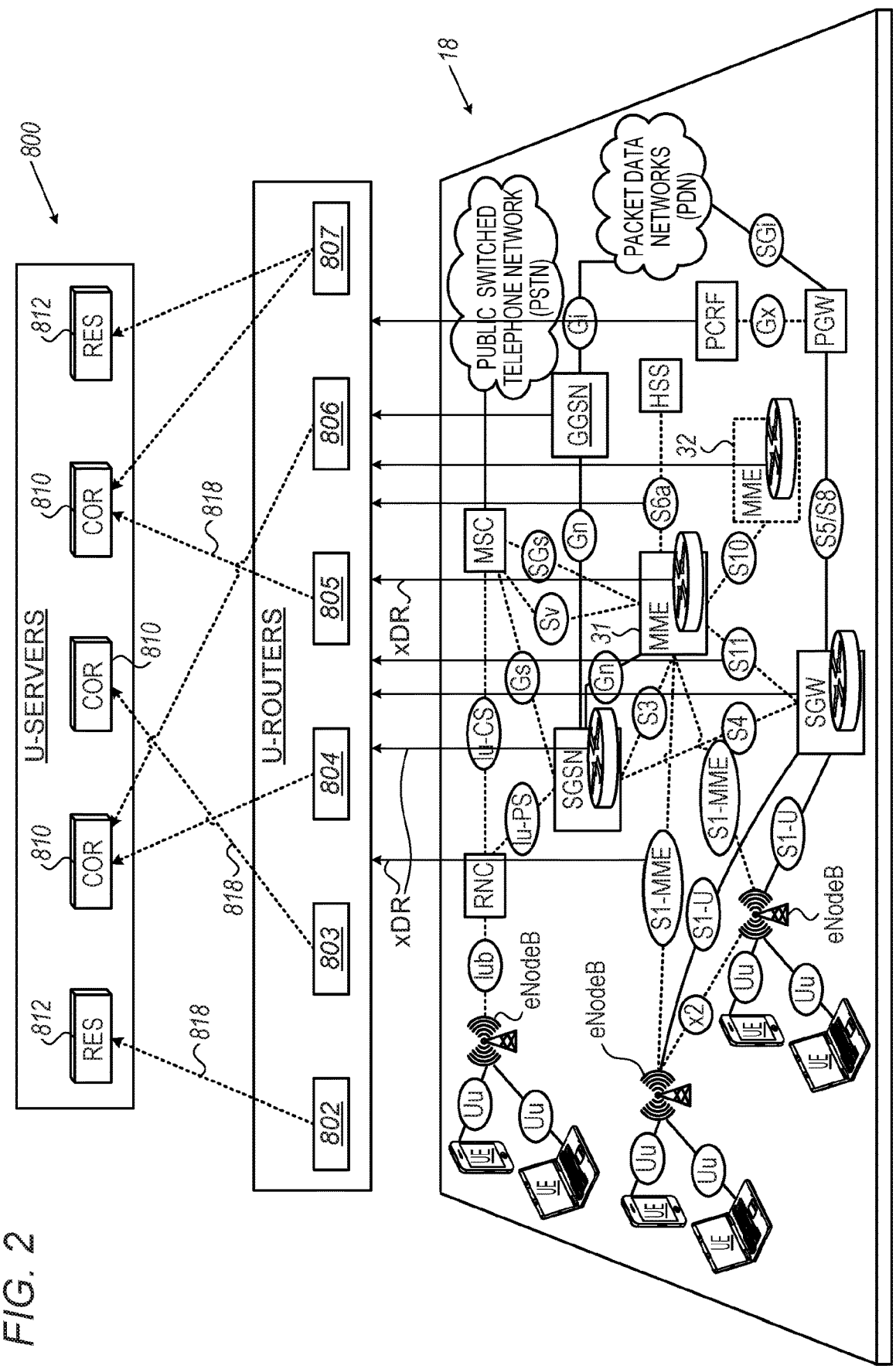
FIG. 2 schematically shows a U-Monitor that receives xDRs generated optionally by elements of the communications network show in FIG. 1 and operating to store the received xDRs correlated with their respective IMSIs and thereby corresponding SIMs, in accordance with an embodiment of the disclosure.
Figure 3:
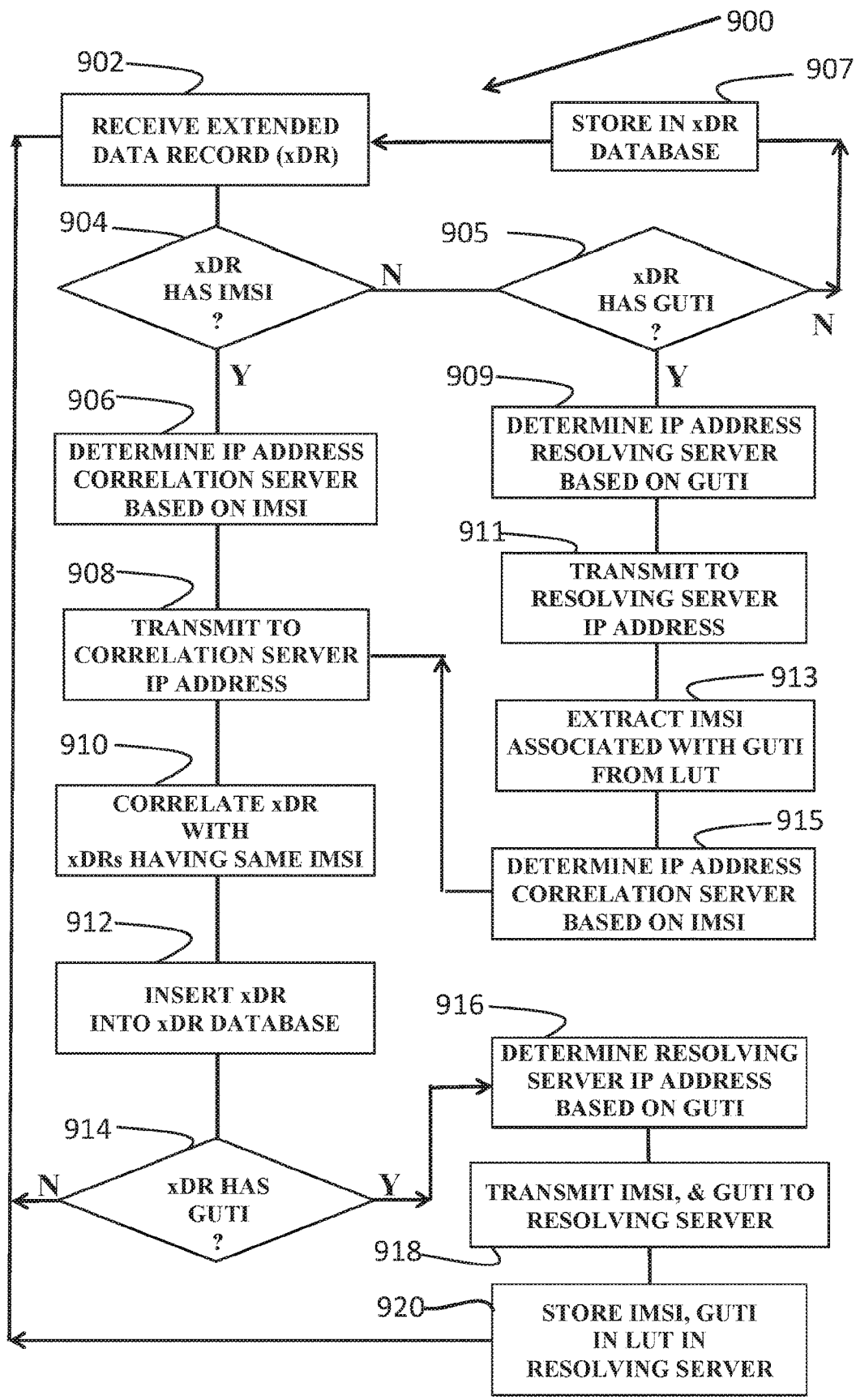
FIG. 3 shows a flow diagram of a procedure by which a U-Monitor may operate to correlate xDRs with their IMSIs and store the correlated xDRs in a xDR database, in accordance with an embodiment of the invention.

In the following detailed description, a U-Monitor, in accordance with an embodiment of the disclosure, is discussed with reference to FIGS. 1-3. The U-Monitor is configured to determine which xDRs that a communications network generates for communications that the network propagates are associated with a same IMSI, and thereby a same SIM, and store the xDRs in a xDR database correlated with their respective IMSIs. FIG. 1 schematically shows a communications network optionally comprising a 3rd Generation Wireless Mobile Communication (3G) network and a LTE (long term evolution) communications network for which a U-Monitor may process and store xDRs that the network generates, in accordance with an embodiment of the disclosure. FIG. 2 schematically shows a U-Monitor in accordance with an embodiment of the disclosure connected to the communications network shown in FIG. 1 to process xDRs that the network generates. FIG. 3 shows a flow diagram of an algorithm by which the U-Monitor shown in FIG. 2 may operate to correlate and store xDRs that the U-Monitor receives from the communications network to which it is connected.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

FIG. 1 schematically shows network elements comprised in a mobile communications network 18 comprising a 3rd Generation Wireless Mobile Communication (3G) network 19 and an evolved packet system (EPS) communications network 20 that operates to connect a user's mobile communication equipment, (UE) to one or more Packet Data Networks (PDNs), and/or, as a circuit switch fallback option, to the Public Switched Telephone Network (PSTN). Network 20 may operate to provide a user's UE with communications to the Internet and/or to stationary and/or mobile communication equipment of other users (not shown). In FIG. 1 mobile user equipment, UE, is schematically represented by smartphone and laptop icons 22.

EPS network 20 comprises a packet switched core network referred to as an Evolved Packet Core (EPC) core network indicated by a dashed boundary labeled EPC and a Long Term Evolution (LTE) radio access network referred to as an Evolved Universal Terrestrial Radio Access Network E-UTRAN indicated by a dashed boundary labeled E-UTRAN. E-UTRAN provides user equipment with wireless radio frequency (RF) channel connectivity to the core network EPC. The core network EPC provides a UE connected to the core network via an E-UTRAN radio channel with a communications connection to a PDN via an internet protocol (IP) packet flow "pipeline", conventionally referred to as a "bearer". The acronym LTE is conventionally used when referring to an evolved packet system (EPS) network comprising both the LTE E-UTRAN and the evolved packet core EPC, and network 20 shown in FIG. 1 may be referred to as LTE network 20, or simply LTE.

E-UTRAN comprises a network of RF communication base stations referred to as evolved NodeB (eNodeB) base stations. Each eNodeB comprises an RF transceiver and integral controller that controls the RF transceiver to establish radio communication channels between UEs in a limited geographic region referred to as a cell, and the core network EPC. Legacy base stations, referred to as NodeB base stations used in 3G networks, do not comprise integral controllers but are connected to radio network controllers (RNCs), operate using RF transmission technologies different from those used by eNodeBs and have limited functionalities in comparison to eNodeB base stations. Core network EPC is capable of communicating with and connecting a UE connected to a NodeB with a PDN network, and LTE network 20 is schematically shown connected to a NodeB base station of 3G network 19 via an RNC and a Serving GPRS (General Packet Radio Service) Support Node, (SGSN) of the 3G network. The SGSN node is responsible for delivery of packets from and to UEs that are connected to a NodeB base station rather than an eNodeB base station. The SGSN is connected to the Internet via a GGSN (GPRS Gateway Support Node). Whereas in FIG. 1 mobile network 18 is shown comprising a E-UTRAN having two eNodeBs and a 3G network having one NodeB, an LTE may and typically does comprise more than two eNodeBs and a 3G network comprising more than one NodeB.

Core network EPC of LTE 20 comprises a plurality of logical nodes, which are supported by virtual and/or physical network entities. The network nodes include, a Serving Gateway (SGW), a PDN gateway (PGW), a Home Subscriber Server (HSS), a Mobile Switching Center (MSC) server, and a Mobile Management Entity (MME). The SGW is a node of the LTE network through which data packets from a UE connected to an eNodeB enter the EPC to be propagated from the UE through the EPC to their destinations, or exit the EPC to propagate to the eNodeB and the UE after propagating through the EPC from their sources. The SGW serves as a local mobility anchor for data bearers when the UE moves between cells of different eNodeBs. The PGW is a node through which UE data packets from a UE connected to the EPC exit the EPC to propagate to a PDN or enter the EPC from a PDN to propagate to the UE. The PGW is responsible for allocating an IP address to the UE and handling various administrative and charging tasks in accordance with information received by the PGW from a node referred to as a Policy and Charging Rules Function (PCRF) node. The HSS node contains user subscription data, such as a QoS profile and any restriction that might limit user roaming. The HSS also contains dynamic information such as an identity of an MME to which the user UE may currently be connected. The MSC node supports signaling between an MME and a UE Subscriber Identity Module (SIM) and Short Message Services (SMS) for a UE connected to the EPC via a NodeB.

The MME is a central control and signaling node that communicates with and orchestrates the activities of the other nodes and the UE in managing the resources of the LTE to establish, route, and maintain IP packet flow between a UE and a PDN. An EPC generally comprises more than one MME and may hand over connection to a UE from one to another of the MMEs as the UE moves between cells of different eNodeBs. In FIG. 1 LTE 20 is shown comprising two MMEs, a first MME 31 represented by a solid line rectangle and indicated by dotted lines as communicating with UEs shown in the figures, and a second MME 32, shown in dashed lines, to which first MME 31 may hand over UEs as the UEs move between cells.

Communication between two nodes in an LTE network is governed by an interface that configures what data the nodes exchange, how packets that contain the data are formatted, and how the packets are transmitted between the nodes. Communication between different node pairs is typically governed by different interfaces. An interface that configures communications between two nodes is indicated in FIG. 1 by an alphanumeric identifying the interface shown in an ellipse overlying a dashed or solid line that extends between the two nodes. For example, eNodeBs in an LTE network exchange control signaling with via an X2 interface, and an X2 is shown in an ellipse overlying a dashed line shown connecting the two eNodeBs in LTE network 20, and a UE communicates with an eNodeBs via a Uu interface shown in an ellipse overlying a solid line between the UE and the eNode B. Similarly as indicated in FIG. 1, the MME node communicates control data with an eNodeB via an S1-MME interface. The S1-MME interface defines data to be exchanged and packet formatting in accordance with an S1-AP protocol and configures transmission of the data between the MME and the eNodeB using the SCTP (Stream Control Transmission Protocol) transport protocol. The MME node communicates with the SGW node via an S11 interface, which tunnels UDP packets between the nodes using a General Packet Radio Service Tunneling Protocol (GTP) referred to as GTP-C. And, the HSS communicates with the MME via an S6a interface that configures data in accordance with a Diameter protocol and transmits Diameter messages using SCTP.

FIG. 2 schematically shows a U-Monitor 800 coupled to communications network 18 operating to receive xDRs generated by the communications network, determine which xDRs are associated with a same SIM and store the xDRs in a xDR database correlated with their respective SIMs, in accordance with an embodiment of the disclosure.

In an embodiment, U-Monitor 800 identifies a xDR as associated with a given SIM by associating the xDR with an IMSI that identifies the SIM. However, a given xDR may or may not comprise an IMSI that identifies a SIM for which the given xDR is generated. For a given xDR that does not comprise an IMSI, U-Monitor 800 may use non-SIM data comprised in the given xDR that may be associated with an IMSI to determine the IMSI identifying the SIM to which the xDR belongs. In an embodiment, the non-SIM data may be a Globally Unique Temporary Identity (GUTI) that an MME, such as MME 31 (FIG. 1) in communications network 18 assigns to a communication in which a UE comprising the SIM participates. Since GUTIs are by definition temporary and assignation of GUTIs to a given SIM are subject to dynamic change, a U-Monitor in accordance with an embodiment maintains and updates at least one database that identifies GUTIs with IMSIs to which they are assigned.

U-Monitor 800 optionally comprises a plurality of six U-routers 802, 803, . . . , 807, and a plurality of five U-Servers comprising, optionally, at least 3 U-Servers referred to as correlation U-Servers 810, and at least two U-Servers referred to as resolving U-Servers 812. By way of example, U-Routers 802, 803, . . . , 807 are schematically shown receiving xDR records, represented by arrows labeled xDR, mirrored from various network elements and interfaces comprised in network 18. By way of example in FIG. 2 U-Monitor 800 is shown receiving xDRs mirrored from interfaces S1-MME, S3 and Gn, S11, Sv and SGs, S6a and S10 between MME 31, and eNodeBs, SGSN, SGW, MSC, HSS, and MME 32, respectively. U-routers 802, 803, . . . , 807 are schematically shown transmitting xDRs represented by dashed arrows 818 to different U-Servers comprised in U-Monitor 800. By way of example, U-Router 802 is shown sending a xDR record 818 to a resolving U-Server 812, U-Routers 803, 804, 805, and 806 are schematically shown sending xDR records to correlation U-Server 810, and U-Router 807 is schematically shown sending a xDR 818 to a resolving U-Server 812 and a xDR 818 to a correlation U-Server 810.

Operation of U-Monitor 800, operation of U-routers 802, . . . , 807 in sending xDRs to specific correlation and/or resolving U-Servers 810 and 812, and operation of the U-Servers is discussed with reference to a procedure illustrated in a flow diagram 900 in FIG. 3 in accordance with which the U-Monitor and its component U-Routers and U-Servers optionally operate. Each of the U-Routers and U-Servers comprised in U-Monitor 800 comprises and/or has access to any of various physical and/or virtual processors and memories that may be required to support functionalities for which U-Monitor 800 is responsible. A U-Router or U-Server may be a physical or virtual entity or a combination of physical and virtual entities, and may comprise or have access to a processor and/or memory having any electronic and/or optical circuitry suitable for processing and/or storing data and/or computer executable instructions. The numeral 900 that references flow diagram 900 may be used to refer to the procedure as well as the flow diagram.

With reference to FIG. 3, in a block 902 of procedure 900 a U-Router, for example, a U-Router 802, 803, . . . , or 807 in U-Monitor 800, receives a xDR from a communications network, such as communications network 18, that the U-Monitor monitors from a node in the network, for example from a network MME, gateway, router, and/or agent that accesses a node or interface comprised in the network. Optionally, in a decision block 904 the U-router determines whether or not the xDR comprises an IMSI. If the xDR does comprise an IMSI, the U-Router may proceed to a block 906 and determine an optionally IP address based on the IMSI for a correlation U-Server that may be assigned to store xDRs associated with the IMSI. The IP address may be determined using any of various methods and/or procedures, such as for example referencing a lookup table (LUT) that associates IMSIs with correlating U-Server IP addresses or by hashing the IMSI to generate an address. In a block 908 the U-Router transmits the xDR to the correlation U-Server having the determined IP address. In an embodiment, the given correlation U-Server to which the xDR is transmitted maintains or has access to a memory (not shown) having a xDR database (not shown) in which the given correlation U-Server stores xDRs that it receives. Upon receiving the xDR, in a block 910 the given correlation U-Server correlates the xDR with other xDRs in the xDR database that have the same IMSI, and in a block 912 may store the xDR in the xDR database correlated with the other xDRs having the same IMSI. Data in the xDRs stored in the xDR database may be used by U-Monitor 800 or any other appropriate network administrator or manager of network 18 (FIG. 1, 2) to determine a use feature associated with a user of network 18, such as by way of example, quality of service (QoS), quality of experience (QoE), user call volume, and/or traffic.

In a decision block 914 the correlation U-Server determines if the xDR comprises a GUTI. If not, U-Monitor 800 returns to block 902 to receive another xDR. If on the other hand the correlation U-Server determines that the xDR does contain a GUTI in addition to the IMSI, the correlation U-Server optionally proceeds to a block 916. In block 916 the correlation U-Server determines an IP address of a resolving U-Server based on the GUTI, and in a block 918 transmits the IMSI and GUTI comprised in the xDR to the resolving U-Server, having the determined IP address, which may for example happen to be resolving U-Server 812 (FIG. 2). In a block 920 the resolving U-Server may store the IMSI and GUTI in a database lookup table (LUT) that associates the IMSI and GUTI if the IMSI and GUTI are not already stored and associated in the LUT. The LUT may be stored in a dedicated memory of the resolving U-Server or may be any suitable memory that the resolving U-Server has access to for performance of the resolving U-Server's functionalities. From block 920, U-Monitor 800 may return to block 902 to receive another xDR.

If in decision block 904 the U-Router of U-Monitor 800 determines that the xDR does not have an IMSI, the U-Monitor cannot correlate the xDR with other xDRs with which it should be correlated until the U-Monitor resolves the question as to which IMSI the xDR belongs. To resolve the question U-Monitor 800 may proceed to a decision block 905 to determine whether the xDR has a GUTI. If in the decision block the U-Monitor 800 determines that in addition to not having an IMSI, the xDR does not have a GUTI, the U-Monitor proceeds to a block 907 and stores the xDR in a xDR database, which is optionally the same xDR database in which the xDR would have been stored in block 912, were the xDR to have comprised an IMSI. If on the other hand, in decision block 905 the U-Router of U-Monitor 800 determines that the xDR does have a GUTI, optionally in a block 909 the U-Monitor determines an IP address of a resolving U-Server (for example a resolving U-Server 812, FIG. 2) based on the GUTI, and in a block 911 U-Monitor 800 may transmit the GUTI to the resolving U-Server having the determined IP address. The resolving U-Server having the determined IP-address is a resolving U-Server having a LUT in which it stores GUTIs, and IMSIs with which the GUTIs are associated, and in particular comprises in the LUT the GUTI comprised in the xDR. In a block 913 the resolving U-Server extracts from the LUT the IMSI associated with the GUTI it received and in a block 915 uses the IMSI to determine an optionally IP address of a correlation U-Server based on the IMSI to which the xDR should be transmitted and proceeds to block 908. In block 908 U-Monitor transmits the xDR to the correlation U-Server having the IP address determined by the resolution U-Server. Optionally in a block 910 the correlation U-Server proceeds to correlate the xDR responsive to the IMSI it received for the xDR from the correlation U-Server with other xDRs in the database that it maintains that have the same IMSI as the received IMSI. In a block 912 the correlation U-Server store the xDR correlated with the other xDRs sharing the IMSI in the database that it maintains.

U-Monitor 800 may then proceed to block 914, and optionally blocks 916-920and return to block 902 to receive another xDR. However, since the correlation U-Server received the IMSI from the resolving U-Server having in the resolving U-Server LUT the GUTI comprised in the xDR, the correlation U-Server does not have to continue through blocks 914-920 to update the LUT in the resolving U-Server. In an embodiment U-Monitor 800 may return from block 912 to block 902 without proceeding though block 914-920.

In an embodiment, as noted above, a given correlating U-Server comprised in U-Monitor 800 may be configured to process xDRs correlated with a same IMSI in a xDR database in which the correlating U-Server stores xDRs that it receives to determine and/or monitor a use feature associated with the IMSI that characterizes use of network 18 by a user of a UE comprising a SIM identified by the IMSI. Alternatively or additionally the correlating U-Server may be configured to provide xDRs correlated with a same IMSI for processing by another server. A use feature associated with a user of network 18 may by way of example be, quality of service (QoS), quality of experience (QoE), user call volume, and/or traffic.

There is therefore provided in accordance with an embodiment of the disclosure a communications network, comprising: a plurality of servers configured to receive data records associated with IMSIs (International Mobile Subscriber Identity) that the network generates comprising metadata characterizing communications that the network propagates, and store the received data records in a memory so that the data records are correlated in the memory with their respective IMSIs; and at least one router configured to receive data records that the network generates and determine to which of the plurality of servers to transmit a given received data record for storage based at least in part on an IMSI associated with the given received data record.

Optionally, the at least one router is configured to use an IMSI comprised in the given received data record as the associated IMSI. Additionally or alternatively the plurality of servers comprises at least one resolving server configured to associate an IMSI with non-IMSI data included in the metadata comprised in a data record.

The at least one router is optionally configured to transmit to the at least one resolving server non-IMSI data comprised in the given received data record for association with an IMSI; and receive from the at least one resolving server the IMSI that the resolving server determines is associated with the non-IMSI data and use the received IMSI as the IMSI associated with the given data record. The at least one router may be configured to transmit the non-IMSI data only if the data record does not comprise an IMSI. Additionally or alternatively the at least one resolving server comprises a plurality of resolving servers. Optionally, the at least one router is configured to determine to which of the plurality of resolving servers to transmit the non-IMSI data for association with an IMSI based at least in part on the non-IMSI data.

In an embodiment of the disclosure the non-IMSI data comprises a GUTI (Globally Unique Temporary Identity). In an embodiment of the disclosure the data record comprises a call data record (CDR). In an embodiment of the disclosure the data record comprises an extended data record (xDR).

There is further provided in accordance with an embodiment of the disclosure apparatus comprising: a plurality of servers; and at least one router; wherein: the plurality of servers and at least one router are configured to receive from a communications network data records that the network generates, which data records are associated with IMSIs and comprise metadata characterizing communications that the network propagates; associate IMSIs with the data records; and store data records associated with a same IMSI in a memory correlated with their shared associated IMSI. Optionally, the plurality of servers comprises at least one resolving server configured to receive non-IMSI data included in a data record metadata and associate the non-IMSI data with an IMSI to associate the data record with an IMSI. The apparatus according to claim 12 wherein the data record comprises a call data record (CDR) or an extended data record (xDR).

There is further provided in accordance with an embodiment of the disclosure a method comprising: receiving from a communications network data records associated with IMSIs that the network generates, the data records comprising metadata characterizing communications that the network propagates; associating IMSIs with the data records; and storing data records associated with a same IMSI in a same memory of a server correlated with their shared associated IMSI and at least two data records associated with different IMSIs in memories of different servers. Optionally, associating an IMSI with a data record comprises associating non-IMSI data included in the metadata of the data record with an IMSI.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A communications network, comprising:
a plurality of servers configured to receive data records associated with IMSIs (International Mobile Subscriber Identity) that the network generates comprising metadata characterizing communications that the network propagates, and store the received data records in a memory so that the data records are correlated in the memory with their respective IMSIs;
at least one resolving server configured to determine to which IMSI a data record is associated responsive to a Globally Unique Temporary Identity (GUTI), in the absence of the data record having an IMSI;
at least one LUT (database lookup table) associated with the at least one resolving server for:
storing IMSI and associated GUTI based on a data record having both IMSI and GUTI; and
enabling extraction of IMSI associated with GUTI of a data record absent an IMSI but having a GUTI; and
at least one router configured to:
receive data records that the network generates;
transmit a given received data record of the received data records that is absent an IMSI but having a GUTI to the at least one resolving server to determine an IMSI associated with the data record based on the GUTI in the data record;
receive the IMSI that the at least one resolving server determines is associated with the given received data record; and
determine to which of the plurality of servers to transmit the given received data record for storage based at least in part on an IMSI associated with the given received data record.

2. The communications network according to claim 1 wherein the at least one router is configured to use an IMSI comprised in the given received data record as the associated IMSI.

3. The communications network according to claim 1 wherein the at least one router is configured to transmit the non-IMSI data only if the data record does not comprise an IMSI.

4. The communications network according to claim 1 wherein the at least one resolving server comprises a plurality of resolving servers.

5. The communications network according to claim 4 wherein the at least one router is configured to determine to which of the plurality of resolving servers to transmit the non-IMSI data for association with an IMSI based at least in part on the non-IMSI data.

6. The communications network according to claim 1 wherein the data record comprises a call data record (CDR).

7. The communications network according to claim 1 wherein the data record comprises an extended data record (xDR).

8. Apparatus comprising:
a plurality of servers comprising at least one resolving server associated with at least one LUT (database lookup table) ; and
at least one router;
wherein the plurality of servers and at least one router are configured to:
receive from a communications network data records that the network generates, and comprise metadata characterizing communications that the network propagates, which data records comprise IMSLs and/or GUTIs;
store in the at least one LUT an IMSI and associated GUTI based on a data record having an IMSI and a GUTI;
associate IMSIs with the data records having the having GUTIs and absent of IMSIs based on the associated IMSIs stored in the at least one LUT; and
store data records associated with a same IMSI in a memory correlated with their shared associated IMSI.

9. The apparatus according to claim 8 wherein the plurality of servers comprises at least one resolving server configured to receive non-IMSI data included in a data record metadata and associate the non-IMSI data with an IMSI to associate the data record with an ISMI.

10. The apparatus according to claim 9 wherein the data record comprises a call data record (CDR) or an extended data record (xDR).

* * * * *